United States Patent [19]
Loeffler et al.

[11] 3,819,557

[45] June 25, 1974

[54] POLYMERIC PIGMENTS AND METHOD FOR PREPARATION THEREOF

[75] Inventors: Norman Raymond Loeffler, Freeport; Hershel Beebe Prindle, Jackson, both of Tex.

[73] Assignee: The Dow Chemical, Midland, Mich.

[22] Filed: Sept. 2, 1971

[21] Appl. No.: 177,431

[52] U.S. Cl. 260/29.6 TA, 117/155 UA, 260/29.6 T, 260/29.6 H, 260/29.7 H, 260/29.7 T, 260/41 R, 260/78.5 BB, 260/80.7, 260/80.8

[51] Int. Cl. .................. C08f 45/04, D21h 1/28

[58] Field of Search... 260/29.6 TA, 29.7 T, 29.7 H, 260/29.6 H; 117/155 UA

[56] References Cited
UNITED STATES PATENTS

| | | | |
|---|---|---|---|
| 2,837,444 | 6/1958 | Hahn | 260/29.6 TA |
| 3,057,812 | 10/1962 | Straughan et al. | 260/29.6 TA |
| 3,265,654 | 8/1966 | Glabisch et al. | 260/29.6 TA |
| 3,297,614 | 1/1967 | Pueschner et al. | 260/29.6 TA |
| 3,501,432 | 3/1970 | Wright et al. | 260/29.6 TA |
| 3,513,120 | 5/1970 | Pohlemann et al. | 260/29.6 TA |
| 3,595,823 | 7/1971 | Huang | 260/29.6 TA |
| 3,634,298 | 1/1972 | Wamsley et al. | 260/29.6 TA |

*Primary Examiner*—Lucille M. Phynes
*Attorney, Agent, or Firm*—R. G. Waterman; M. S. Jenkins

[57] ABSTRACT

Improved polymeric pigments for use in paper coatings are provided by an emulsion polymerization process comprising the steps of (1) emulsion polymerizing at least 50 weight percent of total monomer in absence of emulsifier, (2) adding an emulsifier and (3) continuing emulsion polymerization of the remaining monomer charge.

13 Claims, No Drawings

POLYMERIC PIGMENTS AND METHOD FOR PREPARATION THEREOF

BACKGROUND OF THE INVENTION

This invention relates to polymeric pigments for lightweight paper coatings having high opacity and visual gloss and to a method for the preparation thereof.

Most paper surfaces require a coating in order to have good printing qualities and sufficient opacity. Conventional paper coatings contain inorganic pigments such as kaolin clay or titanium dioxide to give the coated paper substrate the opacity required. However, the inorganic pigments substantially increase the coating weight which in turn increases the cost of mailing substrates so coated.

Recently, lightweight paper coatings containing as pigment, discrete polymeric particles which are insoluble in water and the binder of the coating and which retain their discrete character and particle size of 0.3 to 0.8 micron during coating operation have been disclosed. See Belgian Pat. No. 733,548.

SUMMARY OF THE INVENTION

In accordance with the present invention, there is provided a novel, improved polymeric pigment and a method for the preparation thereof.

In one aspect, the present invention is an aqueous dispersion of the polymeric pigment. The polymeric pigment comprises discrete particles of non-film forming, water-insoluble polymer of emulsion polymerizable monomer. The aqueous dispersion of polymeric pigment is prepared by the method described hereinafter. The discrete particles which comprise the polymeric pigment of this invention have an average diameter in the range from about 0.3 to about 1.0 micron with no more than about 5 weight percent of the particles based on total weight of the discrete polymeric particles of the polymeric pigment having diameters outside of said range.

In a second aspect, this invention is a method for preparing the aqueous dispersion of polymer pigment. This method is a modified emulsion polymerization process comprising the steps of (1) subjecting a polymerization recipe containing an aqueous medium, a catalyst and an incrementally-added initial portion of total emulsion polymerizable monomer to conditions of emulsion polymerization essentially in absence of emulsifying agent, said initial portion of monomer constituting at least about 50 weight percent up to and including 99.9 weight percent of total monomer; (2) subsequently adding to the polymerization recipe from about 0.25 to about 10 weight percent of emulsifying agent based on total monomer; and (3) continuing addition and emulsion polymerization of remaining portion of total monomer.

As a third aspect of this invention, there is provided an improved paper coating composition comprising from about 1.3 to about 11.5 parts by volume of binder per about 38.8 parts by volume of a pigment, at least a portion of which is the aforementioned polymeric pigment which is substantially insoluble in the binder under conditions normally employed in paper coating processes. Said portion of polymeric pigment is sufficient to impart lightweight and/or improved properties such as opacity, brightness, gloss, and printing qualities to dried coatings of said paper coating compositions.

As a fourth aspect of this invention, there is provided a coated paper article comprising a paper substrate having intimately adhered thereto a dried coating of the aforementioned composition wherein the polymeric pigment essentially retains its original discrete character and original particle size.

The practice of this invention utilizing at least an effective amount of the polymeric pigment produces a coated substrate which has a level, unpocked surface and a considerably decreased coating weight. Such coated substrates possess measurably improved brightness, opacity, gloss, and printing qualities as compared to the same properties of a substrate having an adherent coating of binder and non-film forming polymeric particles prepared by conventional emulsion polymerization processes.

DESCRIPTION OF THE PREFERRED EMBODIMENTS

The discrete particles useful as the polymeric pigment are composed of any non-film forming organic polymer which is water-insoluble and is insoluble in the particular binder to be used in the coating composition. Preferred polymers are thermoplastic, organic, resinous materials which are substantially colorless.

By "non-film forming," it is meant that the dispersed polymeric pigment does not coalesce to form a film at ambient temperature and at temperatures selected to dry or finish the coated article. While such temperature requirement varies with the type of finishing method used, it is preferred that the polymer in the form of the discrete particles not be film forming at temperatures of 140° F or less if the coated surface is to be finished by processes such as calendering or super calendering. If the discrete polymeric particles throughout the coating are permitted to fuse or coalesce during the coating process, the light scattering properties (opacity) of the coated surface will be reduced substantially. Accordingly, polymers preferred for use as the polymeric pigment have a Vicat Softening Point, as defined and determined by ASTM D-1525-65-T, of greater than about 140° F. For the same reasons, it is also necessary to use polymeric particles which are not dissolved or softened by the particular binder chosen.

In preparation of the polymeric pigment, any monomer or mixture of monomers can be used which is polymerizable under conditions of aqueous emulsion polymerization and which forms a polymer having the specified physical properties of being water-insoluble and non-film forming. Preferred emulsion polymerizable monomers which can be polymerized and/or copolymerized with each other in any proportions and/or with other monomers as specified hereinafter to yield such polymers include ethylenically unsaturated monomers such as the monovinylidene carbocylic aromatic monomers, e.g., styrene, α-methylstyrene, ar-(t-butyl)styrene, ar-methylstyrene, ar,ar-dimethylstyrene, ar-chlorostyrene, ar-(t-amyl)styrene, ar-bromostyrene, ar-fluorostyrene, ar-cyanostyrene, ar-methoxystyrene, ar-ethylstyrene, ar-hydroxymethylstyrene, ethoxystyrene, ar-chloro-ar-methylstyrene, ar,ar-dichlorostyrene, ar,ar-difluorostyrene, vinyl naphthalene, and other such emulsion polymerizable monomers having not more than 26 carbon atoms; esters of α,β-ethylenically unsaturated carboxylic acids which polymerize to form non-film forming polymers, e.g., methyl methacrylate, chloroethyl methacrylate, 2-butyl methacrylate, 3,3-dimethylbutyl methacrylate, 3,3-dimethyl-2-butyl methacrylate, ethyl methacrylate, isobutyl methacrylate, isopropyl methacrylate, phenyl methacrylate, butyl chloroacrylate, cyclohexyl chloroacrylate, ethyl chloroacrylate, methyl chloroacrylate, isopropyl chloroacrylate and other such esters wherein the alkyl moiety has from 1 to 20 carbon atoms and the acid moiety has from 3 to 8 carbon atoms; $\alpha,\beta$-ethylenically unsaturated esters of non-polymerizable carboxylic acids, e.g., vinyl benzoate, vinyl ar-toluate, vinyl ar-ethylbenzoate, allyl ar-ethylbenzoate, vinyl trimethylacetate, vinyl pivilate, vinyl trichloroacetate and other such monomers wherein the unsaturated moiety has from 2 to 14 carbon atoms and the acid moiety has from 2 to 12 carbon atoms; $\alpha,\beta$-ethylenically unsaturated nitriles, e.g., acrylontrile, methacrylonitrile, fumaronitrile and other such nitriles having not more than 12 carbon atoms; other polymerizable vinyl monomers such as vinyl chloride, vinyl bromide and the like.

The foregoing monomers are generally classified as hard monomers as they polymerize or copolymerize with each other to form non-film forming polymers as required in the practice of this invention.

Lesser amounts, such as less than about 45 weight percent based on the polymer, of other ethylenically unsaturated monomers which normally polymerize to form film-forming polymers (so-called soft monomers) are suitably copolymerized with the foregoing hard monomers. Examples of such monomers include conjugated aliphatic dienes such as 1,3-butadiene, isoprene, 2-chloro-1,3-butadiene and other such dienes having not more than 14 carbon atoms; alkyl acrylates such as methyl acrylate, ethyl acrylate, propyl acrylate, n-butyl acrylate, isobutyl acrylate, amyl acrylate, lauryl acrylate, isoamyl acrylate, 2-ethylhexyl acrylate, octyl acrylate, and other such acrylates having alkyl moieties of not more than 18 carbon atoms; unsaturated esters of saturated carboxylic acids such as vinyl acetate, vinyl propionate, vinyl butyrate, allyl acetate and other such esters having not more than 18 carbon atoms; esters and half esters of $\alpha,\beta$-ethylenically unsaturated polycarboxylic acids, e.g., dimethyl fumarate, diethyl maleate, methyl ethyl fumarate, ethyl hydrogen maleate, dioctyl fumarate and the like; other copolymerizable vinyl monomers containing a single polymerizable ethylenically unsaturated group such as vinyl fluoride, vinylidene chloride and vinylidene fluoride. Maximum concentrations of these monomers are governed primarily by the temperature to be reached by the coating during the coating process and the degree to which a particular monomer lowers the softening point of the resulting copolymer. For illustration, if a copolymer of styrene and butadiene is to be used as the polymeric pigment, budiene normally is not present in the copolymer in amount more than about 20 weight percent. If, however, the styrene/butadiene copolymer has more than the normal amount of crosslinking, butadiene may be present in concentration greater than 20 weight percent with the maximum concentration of butadiene being dependent on the actual degree of crosslinking. Increased crosslinking is usually promoted by irradiation or by use of a suitable crosslinking agent such as unsaturated polyester or polyethylenically unsaturated monomer. Exemplary polyethylenically unsaturated monomers include divinyl benzene, trivinyl benzene, divinyl naphthalene, and the like. In regard to the use of the aforementioned soft monomers, use in any concentration is suitable provided that the resultant polymer is non-film forming as required in the practice of this invention.

In addition to the foregoing monomers, other monomers which may also be copolymerized constituents of the polymeric pigment are $\alpha,\beta$-ethylenically unsaturated carboxylic acids including both mono- and polycarboxylic, e.g., dicarboxylic, acids, such as acrylic acid, methacrylic acid, itaconic acid, fumaric acid, maleic acid and anhydride, citraconic acid and anhydride and other such acids. Maximum concentrations of these acid comonomers in the polymeric pigment are limited by the degree to which they promote water solubility of the polymer. Since the polymeric pigment is required to be water-insoluble, the acid comonomers are generally employed in concentrations not greater than 25 weight percent of the polymeric pigment.

Preferred polymers used in the polymeric pigment are copolymers of from about 40 to about 99 weight percent of one or more of the aforementioned hard monomers, from about 0 to about 45 weight percent of one or more of the aforementioned soft monomers and from about 1 to about 15 weight percent of one or more emulsion copolymerizable $\alpha,-\beta$-ethylenically unsaturated carboxylic acids, preferably those having 3 to 8 carbon atoms. Especially preferred copolymers are copolymers of from about 50 to about 99 weight percent of monovinylidene carbocylic aromatic monomers such as styrene and ar-(t-butyl) styrene, from about 0 to about 49 weight percent of $\alpha,\beta$-ethylenically unsaturated nitrile such as acrylonitrile and methacrylonitrile, and from about 1 to about 5 weight percent of $\alpha,\beta$-ethylenically unsaturated carboxylic acid such as acrylic acid, methacrylic acid and itaconic acid. Examples of such especially preferred copolymers are styrene/acrylic acid copolymers, styrene/acrylonitrile/itaconic acid copolymers, styrene/methacrylic acid copolymers, vinyl benzoate/acrylic acid copolymers, t-butyl styrene/acrylonitrile/acrylic acid copolymers and vinyl chloride/acrylic acid copolymers. In the foregoing preferred copolymers, it is sometimes beneficial to copolymerize from about 1 to about 15 weight percent of polyethylenically unsaturated monomer such as divinyl benzene therewith.

The specific gravity of the preferred polymers used in the practice of the invention usually is within the range of about 0.9 to about 1.4 g/cc. In order that the coating be considerably lighter in weight than coatings containing inorganic pigments, it is preferable that the particles be made from a polymer which is predominantly hydrocarbon since such polymers have a specific gravity generally less than about 1.4. The refractive index of preferred polymers is generally in the range of from about 1.2 to about 1.7, especially from about 1.4 to about 1.6.

In addition to being composed of discrete particles of non-film forming polymer as set forth hereinbefore, it is critical that the polymeric pigment be in the form of particles having an average diameter in the range of from about 0.3 to about 1.0 micron, with no more than about 5 weight percent of the particles based on total weight of particles forming the polymeric pigment having diameters outside said range, preferably not more than 3 weight percent. The method described herein is critical to produce such polymeric particles. Moreover, such method usually produces particles which have essentially rough surfaces as observed with an electron transmission microscope. Aqueous dispersions of these rough surface particles generally provide better coatings. Also, the method often produces bimodal, or even trimodal, aqueous dispersions of polymeric particles wherein most of the polymer is in the form of particles having diameters in the range specified hereinbefore and a minor amount, e.g., not more than about 5 percent, is in the form of particles having diameters in the range of from about 0.03 to about 0.15 micron. In the practice of the method, it has been observed that for any given monomer system an aqueous dispersion of polymeric particles having improved coating properties is always produced as compared to aqueous dispersions made using a conventional emulsion polymerization process.

The polymeric pigment as described hereinbefore is advantageously prepared by an improved emulsion polymerization process as broadly set forth hereinbefore. More specifically, the improved emulsion polymerization process of this invention is preferably prepared in a batchwise manner indicated as follows. The polymerization zone is preferably purged with inert gas, charged with a water-soluble polymerization catalyst and water, and brought to a suitable reaction temperature. The amounts of water and catalyst initially charged to the polymerization zone are those typically employed in conventional emulsion polymerization carried out by continuous feeding of monomer during polymerization. Preferably, the amount of catalyst charged is from about 0.1 to about 1 weight percent based on total monomer and the amount of water charged is from about 50 to about 150 weight percent based on total monomer.

It is understood, however, that it is within the scope of this improved process to charge the polymerization zone with additional amounts of catalyst and water during polymerization, in fact, it is sometimes advantageous to do so and also to add basic materials such as ammonium hydroxide or alkali metal hydroxide in order to enhance stability of the latex. It is further understood that catalyst can be added continuously, separately or with the monomer feed stream. In addition, activators such as a sulfoxylate activator can be added intermittantly or continuously to the polymerization zone in so-called "redoxcatalyzed" polymerization.

As polymerization catalysts, there may be used one or more peroxides which are known to act as free-radical catalysts. Usually convenient are the persulfates (including ammonium, sodium, and potassium persulfates), hydrogen peroxide, or the perborates or percarbonates. There may also be used organic peroxides, either alone or in addition to inorganic peroxide or sulfoxylate compounds. Typical organic peroxides include benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide, and the like.

The choice of an inorganic or organic peroxide catalyst depends in part upon the particular combination of monomers to be polymerized. As might be expected, some of the monomers respond better to one type of catalyst than the other. The usual amount of catalyst required is approximately from about 0.01 percent to about 3.0 percent by weight as based on the weight of the total monomer charge.

In some instances, in order to effect polymerization at a temperature below that at which coagulation of the latex might occur, it may be desirable to activate the catalyst. The activation may be best accomplished by using a redox system in which a reducing agent within the limits of about 0.001 percent to about 6 percent as based on the weight of total monomers is present in addition to the peroxide catalyst. Many examples of such redox systems are known. Agents, such as hydrazine or a soluble oxidizable sulfoxy compound, including the alkali metal salts of hydrosulfites, thiosulfates, sulfites, and bisulfites, and the like can be employed. Redox systems may be activated by the presence of a small amount (a few parts per million) of polyvalent metal ions. Ferrous ions are commonly and effectively used or a tertiary amine which is soluble in the reaction medium may also be used as an activator.

Continuous feeding of the initial portion of total monomer is begun after water and catalyst have been charged or simultaneous therewith. The initial monomer portion constitutes from about 50 to about 99.9 weight percent of total monomer charge, preferably from about 65 to about 85 weight percent. The polymerization zone is brought to desired polymerization temperature which is advantageously in the range of from about 30° to about 98° C, preferably from about 70° to about 98° C, prior to beginning of monomer feed or shortly thereafter. Generally, aqueous dispersions of polymeric particles having better coating properties are produced at the higher temperatures within the aforementioned range. The rate of monomer feed is not particularly critical; however, it is generally desirable to feed at a rate such that addition of total monomer charge will be complete in a period from about 2 to about 24 hours, preferably from about 4 to about 6 hours. It is advantageous, but not critical, to stop the monomer feed after about 7 to about 15 weight percent of the total monomer has been added and the mixture is allowed to digest for about 5 to about 60 minutes before resuming addition of the initial portion of the total monomer charge. This digestion period will hereinafter be referred to as an "initial stage digestion." Such practice usually provides a very mild exotherm in the polymerization, which otherwise, with some monomers, will occur at an unpredictable time and be quite vigorous. Surprisingly, products produced by such practice have even better coating properties than the improved products otherwise obtained. Employment of this advantageous step also reduces the amount of coagulum by-product which is often produced.

It is critical in the practice of the method of this invention that polymerization of the initial portion of total monomer be carried out essentially in the absence of emulsifying agent, i.e., in the presence of very little or no conventional external emulsifying agent. Trace amounts of emulsifying agent such as less than about 0.015 weight percent based on total monomer, and preferably from about 0.0001 to about 0.01 weight percent, may be present during polymerization of the initial portion of total monomer without adversely affecting the product. In fact, for certain monomers, such practice produces products having even better coating properties than the improved products otherwise obtained. For the purpose of this invention, the term "emulsifying agent" includes emulsifiers as defined hereinafter which are conventionally employed in emulsion polymerization, and specifically excludes polyermization catalysts and monomeric materials as defined hereinbefore.

During the initial, substantially emulsifier-free stage of the polymerization reaction, it is preferable to permit polymerization to proceed without addition of further ingredients to the polymerization other than addition of catalyst and, if desired, base and/or activator, for a period of from about 1 to about 8 hours to avoid buildup of reactants. After the initial portion of monomer has been added and polymerization thereof is essentially complete, emulsifying agent is added to the polymerization recipe. As a general rule, from about 0.25 to about 10 weight percent of emulsifying agent based on total monomer is an advantageous amount, with from about 0.5 to about 4 weight percent being preferred. It is especially preferred to add an excess of emulsifying agent. By "an excess" of emulsifying agent is meant an amount more than that required to completely cover the surface areas of the latex polymer particles such that new polymerization sites are provided. Relationship of surface area of latex particles to emulsifier concentration is set forth in D. C. Blackley, *High Polymer Latices*, Vol. 2, 486–491 (1966). The amounts of emulsifiers required to provide an excess depend primarily on the concentration of monomers to be handled and, to a further extent, with the choice of emulsifiers, monomers and proportions of monomers.

Emulsifying agents suitable for the purposes of this invention are the water-soluble anionic and non-ionic surfactants, with anionic or mixtures of anionic and non-ionic being preferred. Non-ionic surfactants which are suitable include the polyoxyalkylene agents, e.g., polyethyleneoxyethanol derivatives of methylene linked alkyl phenols, the ethylene glycol polyethers, the alkyl phenoxy polyethyleneoxyethanols having alkyl groups of 7 to 12 carbon atoms such as nonylphenoxypoly(ethyleneoxy)ethanols and condensation products of ethylene oxide with high alkyl mercaptans having alkyl groups of about 9 carbon atoms, and condensation products of ethylene oxide with alkyl thiophenols having alkyl groups of 6 to 15 carbon atoms; ethylene nonyl phenol polyethers; the fatty acid esters of polyhydric alcohols, e.g., propylene glycol fatty acid ester; and others set forth in Becher, *Emulsions: Theory and Practice*, 2nd Ed., Reinhold Publishing Corporation, New York, 221–225 (1965). Anionic surfactants include water soluble soaps of soap-forming monocarboxylic acids, e.g., alkali metal salts of linoleic acid dimer; and sulfated and sulfonated compounds having the general formula $R - O\ SO_3M$ and $R - SO_3M$, wherein R represents an organic radical having from 9 to 23 carbon atoms and M represents an alkali metal, an ammonium or amine group. Examples of the sulfonate and sulfate emulsifiers include sodium dodecyl benzene sulfonate, sodium oleyl sulfate, ammonium dodecyl benzene sulfonate, potassium lauryl sulfate, sodium dodecyl diphenyl oxide disulfonate, dioctyl potassium sulfosuccinate, dihexyl sodium sulfosuccinate, and the aryl sulfonate-formaldehyde condensation products.

Following addition of the emulsifying agent, the continuous addition of remaining monomer charge to the polymerization zone is resumed and polymerization under similar conditions of time, temperature and catalyst set forth herein is continued. During the period of addition and polymerization of remaining monomer, it is sometimes desirable to charge the polymerization zone continuously or intermittently with a stream of catalyst and, if desired, a stream of base and/or activator. It is preferred to arrange the addition of catalyst, base and/or activator such that addition thereof continues for a short period, i.e., from about one-half to about 2 hours after addition of monomer is completed. During this period of uninterrupted polymerization (so-called final stage digestion), it is generally preferred to maintain the temperature of the resulting aqueous dispersion between about 70° to about 98° C to promote further conversion of monomer to polymer.

Before cooling, the aqueous dispersion of polymeric particles is commonly rendered increasingly alkaline by adjusting the pH to within the range of from about 6 to about 8. This may be done by adding ammonia or a water-soluble amine or an inorganic base, such as potassium or ammonium hydroxide, or a mixture thereof. Ammonium hydroxide, usually giving the best results in the least complicated way, is often preferred.

Having permitted the alkaline, aqueous dispersion to cool to ambient temperature, the aqueous dispersion of polymeric particles can be separated from undesirable impurities such as coagulum by-product, by filtering the aqueous dispersion of polymeric particles through a stainless steel filter having the filter surface perforated to correspond with the standard 16 mesh size of the U.S. Standard Sieve Series.

The filtered aqueous dispersion of polymeric particles prepared by the method described above and ordinarily containing from about 20 to about 60 weight percent, preferably from about 40 to about 50 weight percent, of non-film forming polymeric solids which form the polymeric pigment of this invention is ready to be combined with a suitable binder to provide a paper coating composition. dispersing the polymeric particles (pigment) of the aqueous dispersion in an aqueous medium containing the binder or by blending the aqueous dispersion with the aqueous medium containing the binder, thus eliminating the step of separating the particles from the aqueous dispersion. Generally, suitable ratios of binder to polymeric pigment in the coating range from about 1.3 to about 11.5 volume parts of binder, dry basis, to 38.8 volume parts, calculated on a dry basis, of polymeric particles. The preferred ratios range from about 6.7 to about 10 volume parts of binder to 38.8 volume parts of polymeric particles.

It is further understood that a combination of inorganic pigment and polymeric pigment are contemplated in the practice of this invention. In such combination the polymeric pigment is used in an amount which is effective to lower weight and/or to enhance the coating properties of gloss, pick resistance, printing qualities, brightness or the like as compared to a coating containing only the inorganic pigment as pigment. Preferably, the polymeric pigment constitutes at least about 1 weight percent of the total pigment. Suitable inorganic pigments for this purpose include clays such as kaolinite, illite, montmorillonite and beidellite; and other materials such as titanium dioxide, kieselguhr, calcium carbonate, calcium sulfate, calcium sulfite, blanc fixe, satin white, and zinc pigments, e.g., zinc oxide, zinc sulfide and lithopane.

Binders suitable for the purposes of this invention include coating compositions which are non-solvents for the polymeric pigment to be used and which are adaptable to a paper coating process to provide an adherent, smooth, glossy layer suitable for printing. Exemplary suitable binders include the natural binders such as starch, modified starch, soy bean, protein and casein and commonly known synthetic binders. Suitable modified starch binders include oxidized, enzyme converted, or hydroxy-ethylated starch. Suitable synthetic binders include the styrene/butadiene copolymer latexes; the latexes of polymers of alkyl esters of $\alpha,\beta$-ethylenically unsaturated carboxylic acids such as the alkyl acrylates and methacrylates, especially such aqueous dispersions of polymers which include a small amount of a copolymerized ethylenically unsaturated carboxylic acid; the latexes of copolymers of butadiene and acrylonitrile, latexes of copolymers of vinyl acetate and the alkyl acrylates, latexes of copolymers of butadiene and methyl methacrylate, latexes of copolymers of vinyl chloride and vinylidene chloride, latexes of vinyl chloride polymers, latexes of vinylidene chloride copolymers; aqueous dispersions of polybutadiene, polyvinyl acetate, polyvinyl alcohol and other synthetic polymers commonly used as pigment binders in paper coatings. As is typical of such binders, they are preferably film-forming at room temperature and must be film-forming at temperatures used in the paper coating operation.

The coating is applied to a paper substrate by a conventional technique such as air knife, trailing blade, inverted blade, roll coaters, sprayers and the like.

After the coating is applied, the surface of the substrate is dried and often is then finished by calendering or supercalendering. It is critical that the temperature of the coating does not exceed the softening point of the polymeric particles, otherwise the particles will lose their discrete character or proper size and shape. When this occurs, the opacity and brightness of the coated surfaces drops substantially.

The use of polymeric pigment as at least a portion of the pigment in a paper coating compositions reduces the time required to dry coatings of such compositions and improves finish and visual gloss to papers coated with such compositions.

Where the solvent sensitivity of a specific polymeric pigment presents a problem, a coating containing the polymeric pigment may be applied to the paper substrate as a base coating and such base coating is subsequently coated with a coating containing an inorganic pigment which is not as sensitive to solvents. Since by that procedure much less coating containing the inorganic pigment will be required to yield a surface with the desired gloss and opacity, the total coating weight is usually reduced about 25 per cent.

The following examples illustrate the invention, but are not to be construed as limiting its scope. Except as indicated, all parts and percentages are by weight. Weight parts are based on 100 weight parts of total monomers unless otherwise indicated.

Example 1

Into a five-liter reaction vessel equipped with an agitator, reflux condenser, dropping funnels, thermometer, inert gas line, temperature control apparatus and temperature monitor is added 85 parts of water. After the water is heated to 90° C, an inert gas purge is begun and 0.5 parts of sodium persulfate is added. A continuous monomer stream consisting of 97 percent styrene and 3 percent acrylic acid is begun at the constant rate of addition of about 22.2 parts per hour.

After about thirty minutes and approximately 11.1 parts of the monomers have been added, the monomer feed is stopped, and eight parts of a separate continuous addition stream consisting of 88 percent water and 12 percent sodium persulfate is begun at a continuous rate of 1.45 parts per hour.

After about fifteen minutes, an exothermic condition of the polymerization medium is observed to occur. At this time the monomer feed is resumed at the previously specified rate. After about three more hours of continuous addition of the monomer and catalyst solution streams, approximately 77.7 parts of the total 100 parts of monomers have been added to the reaction vessel. At this time, an emulsifier solution consisting of 10 parts water, 2 parts sodium dodecyl diphenyl ether disulfonate (90 percent active), 4 parts octylphenyl polyethyoxy ethanol (70 percent active) and 0.2 parts sodium persulfate is added over a two to five minute period.

The monomer addition is continued at rate of about 22.2 parts per hour and is complete after about one more hour of continuous addition. The continuous addition stream of catalyst and water is finished about one hour and a half after the monomer feed is complete. The reaction mixture is digested for an additional hour at 82° C and cooled to ambient temperature with stirring. The resulting aqueous dispersion contains 48.3 percent polymer solids having an average particle diameter and scattering coefficient as shown in Table I.

Example 2

Into a reaction vessel as described in Example 1 is added 85 parts of water. After the water is heated to 90° C, an inert gas purge is begun and 0.5 part of sodium persulfate is added. A continuous monomer stream consisting of 92 parts styrene and 6 parts acrylonitrile is begun at a constant rate of addition of about 22.2 parts per hour.

At the same time as the monomer feed is begun, 2.0 parts of itaconic acid are also placed in the reaction vessel. After about thirty minutes of continuous monomer addition and approximately 11.1 parts of the monomers have been added, the monomer feed is then stopped and a separate continuous addition catalyst solution stream consisting of 7 parts water and 1 part sodium persulfate is begun at a continuous rate of about 1.45 parts per hour.

After about thirty minutes of digestion, the monomer feed is resumed at a rate of about 22.2 parts per hour. After about two more hours of continuous addition of the monomer and catalyst solution streams, 0.2 part of ammonium hydroxide is added to the reaction vessel. After a total monomer feed time of about three hours and forty minutes and approximately 81.4 percent of the total monomers have been continuously added to the reaction vessel, an emulsifier solution consisting of 10 parts water and 3.3 parts aqueous solution of sodium lauryl sulfate (33 percent active) is added over a two to five minute period.

The monomer addition is complete after about an additional fifty minutes of continuous addition. The catalyst solution stream is finished about one hour and a half after the monomer feed is complete. The aqueous dispersion is digested for an additional thirty minutes at 90° C and cooled to room temperature with stirring.

The resulting aqueous dispersion contains 48.4 percent polymer solids, and has an average particle diameter and scattering coefficient (opacity) as shown in Table I.

Example 3

Into the reaction vessel described in Example 1 is added 125 parts of water. The water is heated to 90° C under an inert gas purge, and 0.5 part of sodium persulfate is added. A continuous monomer stream consisting of 97 parts t-butyl styrene and 3 parts acrylic acid is begun at a constant rate of addition of about 22.2 parts per hour.

After about thirty minutes of continuous monomer addition and approximately 11.1 parts of the monomers have been added, the monomer feed is stopped and a separate continuous addition catalyst addition stream consisting of 7 parts water and 1 part sodium persulfate is begun at a continuous rate of about 1.45 parts per hour.

After about twenty minutes, the monomer feed is resumed for an additional one hour and ten minutes. At this time the latex is observed to be extremely viscous. The monomer feed is interrupted and the temperature of the reaction medium is reduced to 50° C and maintained until the viscosity of the latex is observed to decrease. The temperature is raised to 70° C and the monomer feed is resumed. About forty minutes after the temperature is raised to 70° C, 0.2 part of 28 percent ammonium hydroxide is added to the latex. After a total of approximately 76 percent of the monomers has been added, an emulsifier solution consisting of 10 parts water and 1.5 part sodium lauryl sulfate (33 percent active) is added to the reaction vessel over a two to five minute period.

The monomer feed is complete after about one more hour of continuous addition. The catalyst solution stream is finished about one hour after the monomer feed is completed. The aqueous dispersion is digested for an additional 3 hours at 70° C, and cooled to room temperature with stirring. The resulting aqueous dispersion contains 39.4 percent polymer solids and has an average particle diameter and scattering coefficient as shown in Table I.

Example 4

Into the reaction vessel described in Example 1, is added 85.0 parts of water. The water is heated to 90° C under an inert gas purge, and 0.5 part of sodium persulfate is added. A continuous monomer stream consisting of 92 parts styrene, 5 parts divinyl benzene and 3 parts acrylic acid is begun at a constant rate of addition of about 22.2 parts per hour.

After about thirty minutes and approximately 11.1 parts of the monomer mixture have been added, the monomer feed is stopped and a separate continuous addition stream consisting of 7 parts water and 1 part sodium persulfate is begun at a continuous rate of about 1.45 parts per hour.

After about thirty minutes, the continuous monomer addition is resumed at rate of about 22.2 parts per hour. After a total monomer feed time of approximately 3 hours and 35 minutes and approximately 79.6 percent of the monomers have been continuously added to the reaction vessel, an emulsifier solution consisting of 10 parts water, 1.5 parts aqueous solution of sodium lauryl sulfate (33 percent active) and 0.2 part sodium persulfate is added to the reaction vessel over a two to five minute period.

The monomer feed is complete after about one hour and five minutes more continuous addition. The catalyst solution stream feed is completed about one hour after the monomer feed is completed. The aqueous dispersion is then cooled to 75° C, digested approximately 2 hours and cooled to room temperature with stirring. The resulting aqueous dispersion contains 46.7 percent polymer solids and has an average particle diameter and scattering coefficient as shown in Table I.

Example 5

Essentially following the procedure of Example 1, 97 parts styrene and 3 parts acrylic acid are polymerized at 95° C by adding 90 percent of total monomers prior to addition of emulsifier solution consisting of 2 parts sodium dodecyl diphenyl ether disulfonate (90 percent active) and 2.8 parts octyl-phenylpolyethoxyethanol (100 percent active). The resulting aqueous dispersion contains 46.8 percent polymer solids and has an average particle diameter and scattering coefficient as shown in Table I.

Example 6

Following the procedure of Example 4, a monomer stream consisting of 97 parts vinyl benzoate and 3 parts acrylic acid is polymerized at 75° C with addition of 90 percent of total monomers prior to addition of the emulsifier solution. The resulting aqueous dispersion contains 47.8 percent polymer solids and has an average particle diameter and scattering coefficient as shown in Table I.

Example 7

Following the procedure of Example 4, a monomer stream consisting of 92 parts styrene, 5 parts alpha-methyl styrene and 3 parts acrylic acid is polymerized. The resulting aqueous dispersion contains 48.6 percent polymer solids and has an average particle diameter and scattering coefficient as shown in Table I.

Example 8

Following the procedure of Example 4, styrene as the monomer feed is polymerized. The resulting aqueous dispersion contains 45.5 percent polymer solids and has an average particle diameter and scattering coefficient as shown in Table I.

Example 9

Following the procedure of Example 4, a monomer stream consisting of 50 parts t-butylstyrene, 47 parts acrylonitrile and 3 parts acrylic acid is polymerized. The emulsifier solution consists of 1.0 part aqueous isopropanol solution of dioctyl sodium sulfosuccinate (60 percent active). The resulting aqueous dispersion contains 45.3 percent polymer solids and has an average particle diameter and scattering coefficient as shown in Table I.

Example 10

Following the procedure of Example 4, a monomer stream consisting of 97 parts vinyl toluene and 3 parts acrylic acid is polymerized. The resulting aqueous dispersion contains 47.7 percent polymer solids and has an average particle diameter and scattering coefficient as shown in Table I.

Example 11

Following substantially the procedure of Example 4 except that at least autogenous pressure is employed, a monomer stream consisting of 97 parts vinyl chloride and 3 parts acrylic acid is polymerized at 75° C. The resulting aqueous dispersion contains 48.2 percent polymer solids and has an average particle diameter and scattering coefficient as shown in Table I.

TABLE I

| Example No. | Latex polymer[1] | Percent polymer solids | Average particle diameter[3] micron | Scattering coefficient[2] |
|---|---|---|---|---|
| 1 | Sty/AA | 48.3 | 0.52 | 0.28 |
| 2 | Sty/VCN/IA | 48.4 | .50 | .28 |
| 3 | TBS/AA | 39.4 | .71 | .26 |
| 4 | Sty/DVB/AA | 46.7 | .50 | .23 |
| 5 | Sty/AA | 46.8 | .43 | .35 |
| 6 | VBz/AA | 47.8 | .65 | .23 |
| 7 | Sty/MS/AA | 48.6 | .52 | .21 |
| 8 | Sty | 45.5 | .46 | .23 |
| 9 | TBS/VCN/AA | 45.3 | .44 | .24 |
| 10 | VT/AA | 47.7 | .62 | .20 |
| 11 | VCl/AA | 48.2 | .27 | .22 |

[1] Sty—styrene, AA—acrylic acid, VCN—acrylonitrile, IA—itaconic acid, TBS—t-butylstyrene, DVB—divinyl benzene, VBz—vinyl benzoate, MS—α-methylstyrene, VT—vinyltoluene, VCl—vinyl chloride.

[2] In determining scattering coefficient of a particular latex, the latex is combined with an ethylated starch binder composition in weight on dry basis of 38.5 weight parts (36.7 volume parts) of latex to 10 weight parts (6.7 volume parts) of starch to form a coating composition. The coating composition is applied with drawdown bars to a polished black glass plate in an amount sufficient to form a film having a wet thickness of 1.5 mil and to a polished white glass plate in amount sufficient to form a film having a wet thickness of 3.0 mils and air dried at room temperature. Brightnesses for the coated black and coated white glass plates are determined by TAPPI Test Method T452-M-58 and used in calculation of scattering coefficient. Scattering coefficient is calculated using the equation: Scattering coefficient = ST/220A wherein ST is a value read directly from Mitton-Jacobsen Graphs plotting the ST value against reflectance of the coating over black and white glass plates and A is the weight in grams of five square inches of coating. Reflectance is equal to 0.01 × brightness. The Mitton-Jacobsen Graphs are described in the *Official Digest*, September 1963, pp. 885–911.

[3] Not more than about 5 weight percent of particles have diameters outside the range of 0.3 to 1.0 microns.

Example 12

For purposes of further illustration of the invention, the procedure of Example 1 is repeated several times with addition of the emulsifier solution at various times during polymerization. The resulting aqueous dispersions contain 46–50 percent polymer solids and have average particle diameters and scattering coefficients as shown in Table II. The percent yields of coagulum by-products formed in the several runs are also shown in Table II.

TABLE II

| Run No. | % Monomer[a] added prior to addition of emulsifier | % Yield of coagulum | Average particle diameter micron | Scattering Coefficient[1] |
|---|---|---|---|---|
| 1* | 16.5 | 4.2 | 0.41 | 0.06 |
| 2* | 33 | 2.3 | 0.42 | 0.10 |
| 3 | 67 | 0.4 | 0.43 | 0.19 |
| 4 | 77 | 0.2 | 0.45 | 0.24 |
| 5 | 90 | 1.3 | 0.43 | 0.25 |
| 6 | 99.5 | 5.4 | 0.56 | 0.31 |
| 7 | 99.9 | ND | 0.56 | 0.23 |
| 8* | 100 | ND | 0.49 | 0.16 |

* Not an example of this invention
ND—Not determined
[a] Monomer—97% styrene and 3% acrylic acid
[1] Same as (2) in Table I

Example 13

For purposes of comparison, the procedure of Example 6 is repeated several times with addition of the emulsifier solution at various times during polymerization. The resulting 46–50 percent polymer solids, aqueous dispersions have average particle diameters and scattering coefficients as shown in Table III.

TABLE III

| Run No. | % Monomer[a] added prior to addition of emulsifier | Average particle diameter micron | Scattering coefficient[1] |
|---|---|---|---|
| 1* | 0 | 0.20 | 0.19 |
| 2 | 67 | 0.84 | 0.21 |
| 3 | 90 | 0.65 | 0.23 |

* Not an example of this invention
[a] Monomer—97% vinyl benzoate, 3% acrylic acid
[1] Same as (2) in Table I

Example 14

For purposes of showing the effect of the presence of trace amounts of emulsifier during polymerization of the initial portion of monomer, the procedure of Example 6 is repeated several times wherein each time a different very small amount of emulsifier solution is added at the start of the polymerization. The procedure is further altered by adding 67 percent of the monomers prior to addition of the specified major portion of emulsifier solution. The resulting aqueous dispersions contain 46–50 percent polymer solids and have average particle diameters and scattering coefficients as shown in Table IV. Table IV

TABLE IV

| Run No. | Initial concentration of emulsifier[1] | Average particle diameter, micron | Scattering coefficient[2] |
|---|---|---|---|
| 1 | 0 | 0.84 | 0.21 |
| 2 | 0.0015 | 0.69 | 0.20 |
| 3 | 0.00298 | 0.64 | 0.24 |
| 4 | 0.00744 | 0.53 | 0.25 |
| 5* | 0.015 | 0.27 | 0.19 |

* Not an example of this invention
[1] Weight percent based on total monomer
[2] Same as (2) in Table I

Example 15

For purposes of showing the effect of temperature in the process, the procedure of Example 1 is repeated several times, each time at a different temperature. The resulting 46–50 percent polymer solids, aqueous dispersions have average particle diameters and scattering coefficients as shown in Table V.

TABLE V

| Run No. | Polymerization temperature, °C. | Average Particle Diameter, micron | Scattering Coefficient[2] |
| --- | --- | --- | --- |
| 1 | 82 | 0.69 | 0.22 |
| 2 | 85 | 0.51 | 0.22 |
| 3 | 90 | 0.39 | 0.29 |
| 4 | 97 | 0.39 | 0.31 |

[1]Same as (2) in Table I

Example 16

For purposes of showing the effect of an initial stage digestion, the procedure wherein the monomer feed is not stopped after about thirty minutes but is continued at the same rate along with the separate continuous addition of catalyst at this time. The resulting 46–50 percent polymer solids, aqueous dispersions have average particle diameters and scattering coefficients as shown in Table VI and are compared with procedure of Example 1 employing the initial stage digestion.

TABLE VI

| Run No. | Initial stage digestion | Average particle diameter, micron | Scattering coefficient[1] |
| --- | --- | --- | --- |
| 1 | No | 0.52 | 0.20 |
| Example No. 1 | Yes | 0.52 | 0.28 |

[1]Same as (2) in Table I.

What is claimed is:

1. A method for preparing an aqueous dispersion of non-film forming polymeric particles useful as pigment in paper coatings which comprises the steps of (1) subjecting a polymerization recipe comprising an aqueous medium, a catalyst and an incrementally-added initial portion of emulsion polymerizable monomer to conditions of aqueous emulsion polymerization, essentially in the absence of emulsifying agent, said initial portion constituting at least about 67 weight percent up to and including 99.9 weight percent of total monomer, (2) subsequently adding emulsifying agent to the recipe in an amount of from about 0.25 to about 10 weight percent based on total monomer; and (3) continuing addition and emulsion polymerization of the remaining portion of the total monomer, said total monomer being capable of polymerizing under said conditions of aqueous emulsion polymerization to form a non-film forming, water-insoluble polymer, said emulsifying agent defined as being selected from the group consisting of water-soluble anionic surfactant, non-ionic surfactants and mixtures thereof, and excluding polymerization catalysts and monomeric materials, said total monomer being polymerizable to form a non-film forming copolymer comprising from about 40 to about 99 weight percent of polymerizable hard monomer selected from the group consisting of monovinylidene carbocyclic aromatic monomer, esters of $\alpha,\beta$-ethylenically unsaturated carboxylic acids which polymerize to form non-film forming polymers, $\alpha,\beta$-ethylenically unsaturated esters of non-polymerizable carboxylic acids which polymerize to form non-film forming polymers, $\alpha,\beta$-ethylenically unsaturated nitriles, other vinyl monomers which polymerize to form non-film forming polymers and mixtures of said hard monomers; up to about 45 weight percent of an emulsion polymerizable soft monomer selected from the group consisting of conjugated aliphatic dienes, alkyl acrylates, unsaturated esters of saturated carboxylic acids, esters and half esters of $\alpha,\beta$-ethylenically unsaturated polycarboxylic acids, other vinyl monomers which polymerize to form film forming polymers, and mixtures of said soft monomers; and from about 1 to about 15 weight percent of at least one $\alpha,\beta$-ethylenically unsaturated carboxylic acid.

2. The method according to claim 1 wherein the initial portion of monomer is from about 67 to about 85 weight percent of total monomer.

3. The method according to claim 2 wherein step (1) is interrupted after about 7 to about 15 weight percent of total monomer has been added and the polymerization recipe is allowed to digest for a period in the range of from about 5 to about 60 minutes before addition of monomer is resumed.

4. The method according to claim 1 wherein the polymerization recipe contains less than about 0.015 weight percent of an emulsifying agent during step (1).

5. The method according to claim 3 wherein the polymerization recipe contains less than about 0.015 weight percent of an emulsifying agent during step (1).

6. The method according to claim 1 wherein total monomer polymerizes to form a non-film forming copolymer comprising from about 50 to about 99 weight percent of monovinylidene carbocyclic aromatic monomer; from about 0 to about 49 weight percent of emulsion polymerizable $\alpha,\beta$-ethylenically unsaturated nitrile and from about 1 to about 5 weight percent of emulsion polymerizable $\alpha,\beta$-ethylenically unsaturated carboxylic acid.

7. An aqueous dispersion of non-film forming polymeric particles having an average diameter in the range of from about 0.3 to about 1.0 micron with no more than about 5 weight percent of said particles having diameters outside of said range, said dispersion being prepared by the method of claim 1.

8. The aqueous dispersion according to claim 7 wherein the polymeric particles comprise from about 50 to about 99 weight percent of monovinylidene carbocyclic aromatic monomer; from about 0 to about 49 weight percent of emulsion polymerizable $\alpha,\beta$-ethylenically unsaturated nitrile and from about 1 to about 5 weight percent of emulsion polymerizable $\alpha,\beta$-ethylenically unsaturated carboxylic acid.

9. An aqueous paper coating composition adapted to a paper coating process for printing comprising a binder and a pigment wherein at least a portion of the pigment is in the form of discrete, non-film forming polymeric particles having an average diameter in the range of from about 0.3 to about 1.0 micron, with no more than 5 weight percent of said particles having diameters outside of said range, said particles being formed by the method of claim 1, said coating composition containing from about 1.3 to about 11.5 volume parts of binder per 38.8 volume parts of pigment, said portion of polymeric particles being sufficient in said coating composition to produce a coating having improved properties, said particles being insoluble in water and the binder.

10. A coated comprising a paper substrate having intimately adhered thereto an improved coating comprising a binder and a pigment, at least a portion of said pigment being in the form of discrete, non-film forming polymeric particles having an average diameter in the range of from about 0.3 to about 1.0 micron, with no more than 5 weight percent of said particles having diameters outside of said range, said particles being formed by the method of claim 1, the volume ratio of binder to pigment being in the range from about 1.3 to about 11.5 volume parts of binder to 38.8 volume parts of pigment, said portion of polymeric particles being sufficient in said coating to impart improved properties.

11. The method of claim 1 wherein the emulsifying agent is present in an amount less than 0.015 weight percent based on total monomer during polymerization of the initial portion of the total monomer.

12. The method of claim 11 wherein said amounts of emulsifying agent is in the range from about 0.0001 to about 0.01 weight percent.

13. The method of claim 1 wherein after from about 7 to about 15 weight percent of total monomer has been added to the resulting polymerization, the recipe is allowed to digest for about 5 to about 60 minutes before resuming addition of the initial portion of monomer.

* * * * *

UNITED STATES PATENT OFFICE
CERTIFICATE OF CORRECTION

Patent No. 3,819,557          Dated June 25, 1974

Inventor(s) Norman Raymond Loeffler and Hershel Beebe Prindle

It is certified that error appears in the above-identified patent and that said Letters Patent are hereby corrected as shown below:

Column 8, line 35, before the word "dispersing", insert --The paper coating so described may be combined by--.

Column 14, line 58, the words "Table IV" should be centered above the table.

Column 17, line 4, insert the word --paper-- before the word "comprising".

Signed and sealed this 5th day of November 1974.

(SEAL)
Attest:

McCOY M. GIBSON JR.          C. MARSHALL DANN
Attesting Officer          Commissioner of Patents